United States Patent
Meier et al.

(10) Patent No.: US 9,251,011 B2
(45) Date of Patent: Feb. 2, 2016

(54) BACKUP OF IN-MEMORY DATABASES

(71) Applicants: Andreas Meier, Heidelberg (DE); Thomas Kunz, Walldorf (DE)

(72) Inventors: Andreas Meier, Heidelberg (DE); Thomas Kunz, Walldorf (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 14/102,498

(22) Filed: Dec. 11, 2013

(65) Prior Publication Data

US 2015/0161012 A1    Jun. 11, 2015

(51) Int. Cl.
*G06F 11/14* (2006.01)
*G06F 17/30* (2006.01)

(52) U.S. Cl.
CPC ........ *G06F 11/1458* (2013.01); *G06F 11/1448* (2013.01); *G06F 11/1469* (2013.01); *G06F 17/30088* (2013.01)

(58) Field of Classification Search
CPC ............ G06F 11/1469; G06F 11/1448; G06F 2201/84; G06F 17/30088; G06F 11/1446; G06F 17/30
See application file for complete search history.

(56) References Cited

U.S. PATENT DOCUMENTS

| | | | | |
|---|---|---|---|---|
| 7,774,316 B2 * | 8/2010 | Breau | ................. | G06F 11/1448 707/652 |
| 9,021,222 B1 * | 4/2015 | Sadhu | ................. | G06F 11/1446 711/144 |
| 2013/0073813 A1 | 3/2013 | Bacik | | |
| 2014/0006354 A1 * | 1/2014 | Parkison | ........... | G06F 17/30194 707/649 |

* cited by examiner

Primary Examiner — Bruce Moser

(57) ABSTRACT

Various embodiments of systems and methods for performing backup operation in In-memory database systems are described herein. The method includes receiving a request to create a backup of a data set from a main memory of the system. In response to the request, the data set is configured as read-only and a data structure having meta-data information identifying the blocks of data in the main memory that form the data set is invoked. A snapshot of the data structure is created and the data set is enabled for manipulation. Further, the method involves receiving a request to modify a block of data and copying the requested data block to a free memory block in the main memory. The data structure is updated by replacing the meta-data identifying the requested original data block with meta-data identifying the free memory block which holds a copy of the requested data block.

17 Claims, 5 Drawing Sheets

200

BACKUP OF IN-MEMORY DATABASES

FIELD

The field relates generally to performing backup operation in database systems. More particularly the field relates to increasing uptime rate while performing backup of databases.

BACKGROUND

With recent developments in memory systems, available addressable volatile memory, e.g., operative memory or random access memory (RAM), per server has increased enabling the storage of large volumes of data by data processing systems such as the In-memory Appliance. The In-memory appliance keeps the bulk of its data in volatile memory for maximum performance, but still uses persistent storage (non-volatile memory) to provide a fallback in case of failure. During normal operation of the database, data is automatically saved from memory to disk at regular savepoints.

However, performing a backup of databases that are stored in main memory would require taking a full backup of the file system as well as the main memory over a span of certain time period. During this time, the system may not be used in parallel due to a drastic reduction in the system's performance. Further, working on the data being copied may result in inconsistent copy of data. In order to avoid this situation, typically, the work processes currently executed on the data being copied are interrupted partially or completely until the copy operation is completed. Alternative solutions include capturing all the data changes in a log and saving the log from main memory to persistent storage after each committed database transaction. The data can be recovered like any disk-based database, e.g., returned to its last consistent state by replaying the log since the last savepoint.

SUMMARY

Various embodiments of systems and methods for performing backup operation in database systems are described herein. In an embodiment, a request to create a backup of a data set from a main memory of the system is received. The request may be generated upon the occurrence of one or more events such as a scheduled backup or a power shutdown. In response to the request, any manipulation of the data set by the system is disabled. Further, a data structure comprising meta-data information identifying one or more blocks of data in the main memory that form the data set is invoked. The one or more blocks of data represent segments of the data in the main memory. In another aspect, a snapshot of the data structure is created and stored in the main memory. The snapshot of the data structure represents a consistent copy of the data structure as it was at a particular point in time. Subsequently, the manipulation of the data set by the system is enabled. In an aspect, a request to modify a data block of the one or more blocks of data is received. In response to the request, the requested data block is copied to a free memory block in the main memory. In another aspect, the data structure is updated by replacing an original meta-data identifying the requested data block with new meta-data identifying the free memory block which holds the copy of the requested data block. Further, a backup of the data set is created by duplicating the data set using meta-data information from the snapshot of the data structure and storing the duplicated data set in a target memory.

A computer system may operate to implement the method described above. The computer system may store, execute or be otherwise controlled by one or more computer programs that control the computer system to implement the method described above.

A non-transitory computer readable medium may store instructions to control a computer system to perform the method described above. The instructions may include an In-memory database component, a processing component, and an output component.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for performing backup operation in database systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

An In-memory data processing system may perform both transactional and analytic data processing due to the speed available from storing the data in main memory (as opposed to the disk storage). In-memory data processing systems enable organizations to analyze their business operations using huge volumes of detailed information while the business is running. In-memory computing technology allows the processing of massive quantities of data in main memory to provide quick results from analysis and transaction. Ideally, the data to be processed is real-time data (that is, data that is available for processing or analysis immediately after it is created). This enables organizations to instantly explore and analyze all of its transactional and analytical data in real time.

The In-memory database holds the bulk of its data in main memory for maximum performance, but it still uses persistent storage to provide a fallback in case of failure. For example, after a power failure, the database can be restarted like any disk-based database and returns to its last consistent state. Typically, backups are required protection against data loss, e.g., resulting from hardware failure. However, making a backup of the data kept in the Main memory could be an intensive task resulting in performance slowdowns, making it difficult if not impossible to access the data in parallel by other processing functions. To avoid/reduce downtime due to backup operations, a snapshot mechanism is employed directly in a Memory Management Unit (MMU) of the Central Processing Unit (CPU. The example embodiments illustrated below using FIG. 1 to FIG. 5, describe in detail the techniques for performing backup operation in database systems using snapshot mechanism.

Figure 1:
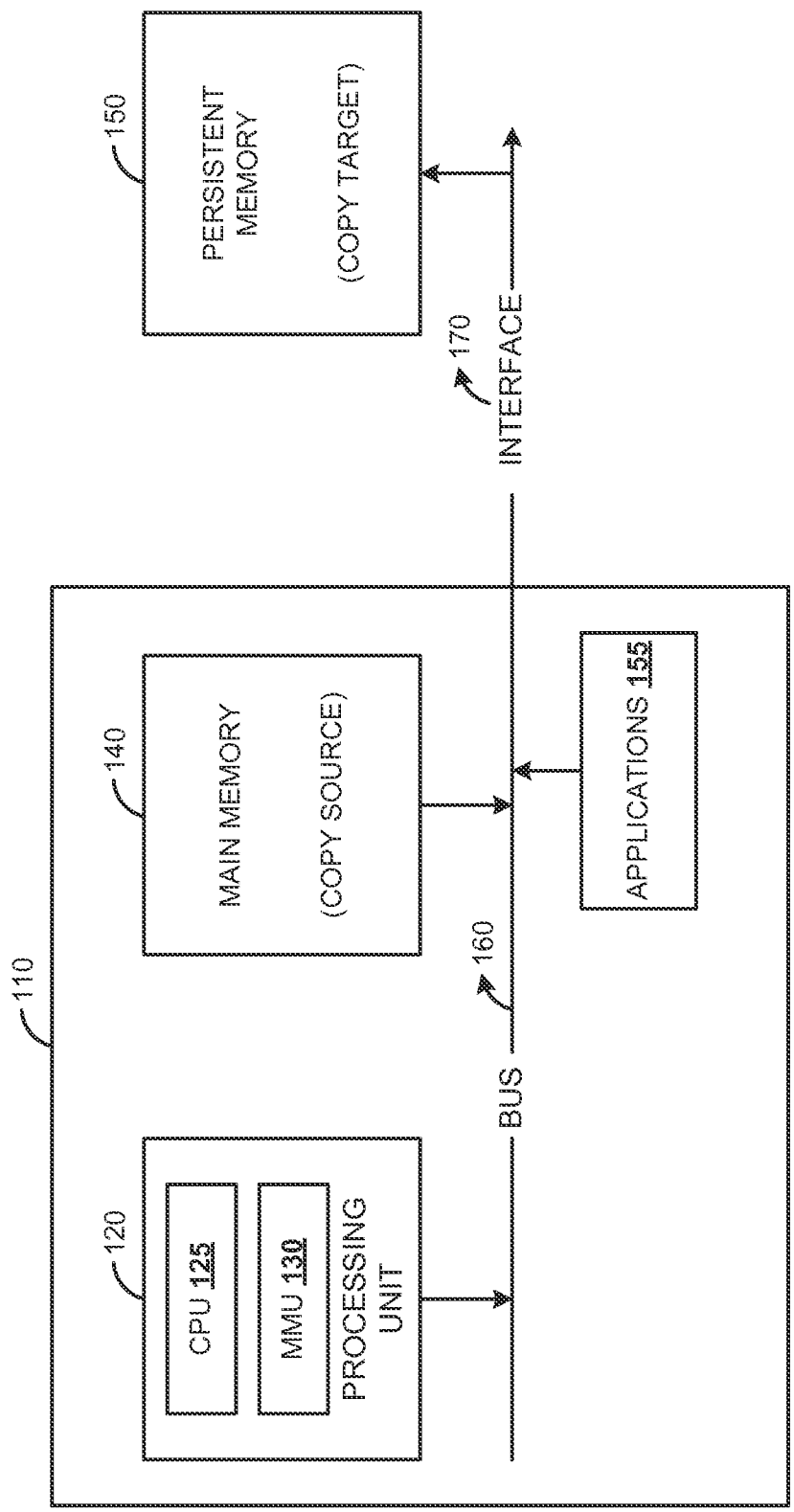
FIG. 1 illustrates a block diagram of an exemplary system implementing the process of performing backup operation in In-memory database systems, according to one embodiment.

FIG. 1 is a block diagram of a database system such as an In-memory database system in the exemplary form of computer system 110 within which a set of instructions may be executed to cause the In-memory database system to perform the processes discussed hereinafter. The computer system may be a personal computer (PC), a tablet PC, a Personal Digital Assistant (PDA), a cellular telephone, a web appliance, a server, or any device capable of executing a set of instructions. Further, while only a single computer system is illustrated, the term "computer" shall also be understood to include a collection of computers that individually or jointly execute a set (or multiple sets) of instructions to perform any one or more of the processes discussed herein.

The exemplary computer system 110 includes processing unit 120, main memory 140, persistent memory 150, and one or more applications 155. The term "main memory" as used herein is a volatile memory such as random access memory (RAM), dynamic random access memory (DRAM) such as synchronous DRAM (SDRAM) or Rambus DRAM (RDRAM), etc. The persistent storage device 150 is a non-volatile memory such as flash memory, hard disk drive, optical drive, etc. The main memory 140 and the processing unit 120 communicate with each other via bus 160. The processing unit 120 and the persistent storage 150 communicate with each other via interface 170.

The processing unit 120 includes one or more general-purpose processing devices such as a microprocessor, central processing unit (CPU) 125, memory management unit (MMU) 130 or the like. The MMU 130 is responsible for handling accesses to memory requested by the CPU 125. Its functions include translation of virtual addresses to physical addresses (i.e., virtual memory management), memory protection, cache control, bus arbitration, etc. The MMU typically divides the virtual address space (the range of addresses used by the processor) into pages, each having a size which is a power of 2, usually a few kilobytes. The processing unit 120 is configured to execute the processing logic for performing the operations and steps discussed herein below.

As discussed above, the In-memory database system (IMDB; also main memory database system or MMDB or memory resident database) primarily relies on main memory 140 for computer data storage, in contrast to database management systems that rely on disk storage. Main memory databases are faster than disk-optimized databases since the internal optimization algorithms are simpler and execute fewer CPU instructions. Accessing data in main memory reduces seek time when querying the data, which provides faster and more predictable performance than when accessing data on disk. In their simplest form, main memory databases store data on volatile memory devices.

Applications 155 provide interface for generating system calls to open, read, write, or close memory blocks in the main memory 140. A kernel space within the In-memory database system includes a system call interface that switches the system calls from the applications to one or more memory block in the main memory 140 with read/write requests and other administrative tasks.

In an embodiment, the Memory Management Unit 130 includes a backup manager for saving a snapshot of a database in Main memory 140 to persistent memory 150. In an aspect, the main memory 140 is divided into fixed size blocks, which are sequences of bytes or bits. A block may be the smallest unit of storage space that is allocated/managed. Typical block sizes include 1 Kb, 2 Kb, 4 Kb and 8 Kb. A block group is a sequence of blocks, and is also known as an extent. A snapshot mechanism is implemented in the MMU 130 for making a backups of databases stored in the main memory 140. A snapshot is the state of a database at a particular point in time. A database snapshot provides a read-only, static view of a source database as it existed at the time of snapshot creation, minus any uncommitted transactions. Snapshot maybe generated periodically, or, at least when, for example, the In-memory database system is doing a controlled shut-down.

In an embodiment, a backup of a data set is done by simply taking a snapshot of a data structure for the data set. As used herein, the term "data structure" refers to a structure having meta-data describing which blocks of data in the main memory form a particular data set. In an aspect, the data structure is a Link Descriptor Table (LDT) that represents a stream of data in the main memory. Since database snapshots operate at the data-page level, an original page is copied from the source database to the snapshot before the page of the source database is modified for the first time. The snapshot stores the original page, preserving the data records as they existed when the snapshot was created. Subsequent updates to records in a modified page do not affect the contents of the snapshot.

In an embodiment, in order to make the data set available for subsequent changes/modifications or write operations, the data set is configured as read-only and a snapshot of the data structure for the data set is copied to a memory space in the main memory. Subsequent to taking the snapshot, the data set is made available for processing/manipulation by any requesting programs. Any subsequent changes or updates to the data set after the snapshot may be captured during a subsequent backup operation. However, instead of duplicating all the blocks of data (forming the data stream) each time the data set is subject to modification, only particular blocks, i.e., only the blocks representing the data that is requested for modification is duplicated. The duplicated data block is stored in a free block in the main memory 140. A free block is an empty block that contains no data and has not yet been allocated memory space for data. The data structure is then updated by replacing the meta-data identifying the data block for the original data prior to modification with a meta-data identifying the free block which currently holds the duplicated data. The applications requesting access to the data for modification may access the duplicated data in the new memory block and perform parallel processing of the data set while a backup operation is being performed on the original data set. In an aspect, the backup of the original data set is performed by duplicating the original data set using the meta-data information from the snapshot of the data structure and storing the duplicated data set in a non-volatile target memory.

Figure 2:
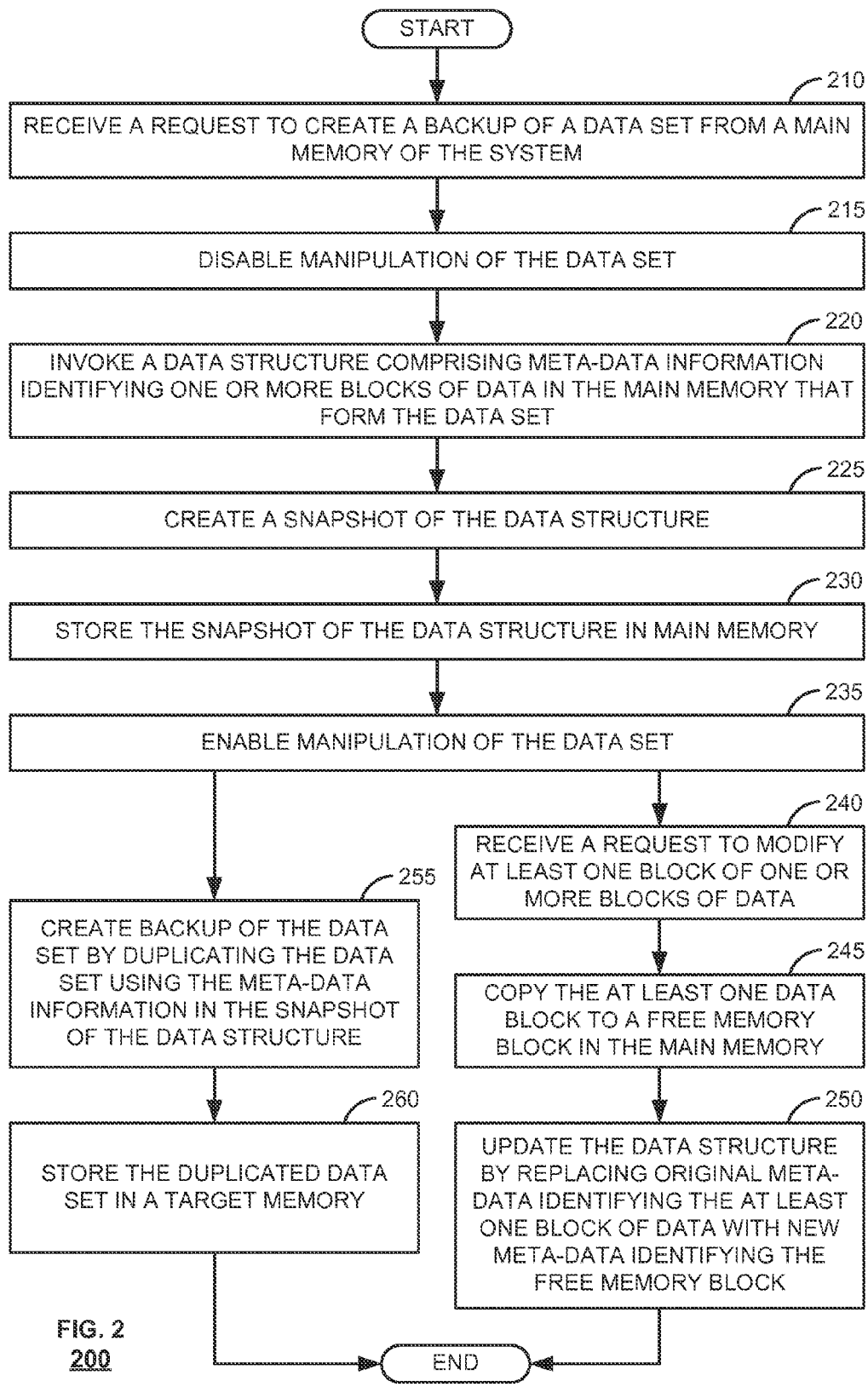
FIG. 2 is a flow diagram of a process of performing backup operation in In-memory database systems, according to an embodiment.

FIG. 2 is a flow diagram illustrating a process 200 for performing backup operation in In-memory database systems. Portions of process 200 are performed at a system (e.g., system 110) having one or more processors and non-transitory memory, which stores one or more instructions to be executed by the one or more processors of the system 110. The process 200 involves receiving a request to create a backup of a data set (original) in a main memory (Source memory) of the system at process block 210. The request may be generated in response to the occurrence of an event. Examples of such events include a scheduled backup, system upgrade, power shutdown, software installation, etc. Upon receiving the request, at process block 215, the data set is configured as read-only in order to prevent the manipulation of the data set by the system. Further, a data structure comprising links to one or more blocks of data in the main memory is invoked at process block 220. The one or more blocks of data represent segments of data that form the data set in the main memory.

At process block 225, a snapshot of the data structure is created. The snapshot of the data structure represents a consistent copy of the data structure as it was at a particular point in time. The created snapshot is then stored in an available memory space in the main memory at process block 230. Subsequent to creating the snapshot, the data set is enabled for manipulation at process block 235. Further, the method involves receiving a request to modify at least one block of the one or more blocks of data by one or more applications at process block 240. In response to the request to modify, the requested data block is copied to a free memory block in the main memory at process block 245. Further at process 250, the data structure is updated by replacing an original meta-data identifying the requested data block (original data) with meta-data identifying the free memory block which currently represents the copy of the original data block. Further, at process block 255, a backup of the original data set is created by duplicating the original data set, i.e., by building the stream of data representing the original data set using the meta-data information from the snap shot created at process block 225. For example, the original data set is duplicated by putting together the data blocks identified by the meta-data information in the snapshot. The data blocks identified by the meta-data information in the snapshot represent the segments of data in the original memory locations in the main memory. At process block 260, the duplicate data set is stored in a target memory. The term "target" memory as used herein refers to a destination for storing the duplicate data set. The target memory is a non-volatile memory where data persists even after the system is shutdown. In an aspect, the process steps 240 to 250 are carried out in parallel to the process steps 255 and 260, without interrupting the applications from accessing the data set during backup. Further, in an aspect, subsequent to creating the backup, the snapshot of the data structure and the copy of the data block requested for modification may be deleted from the main memory in order to free memory space.

Figure 3:
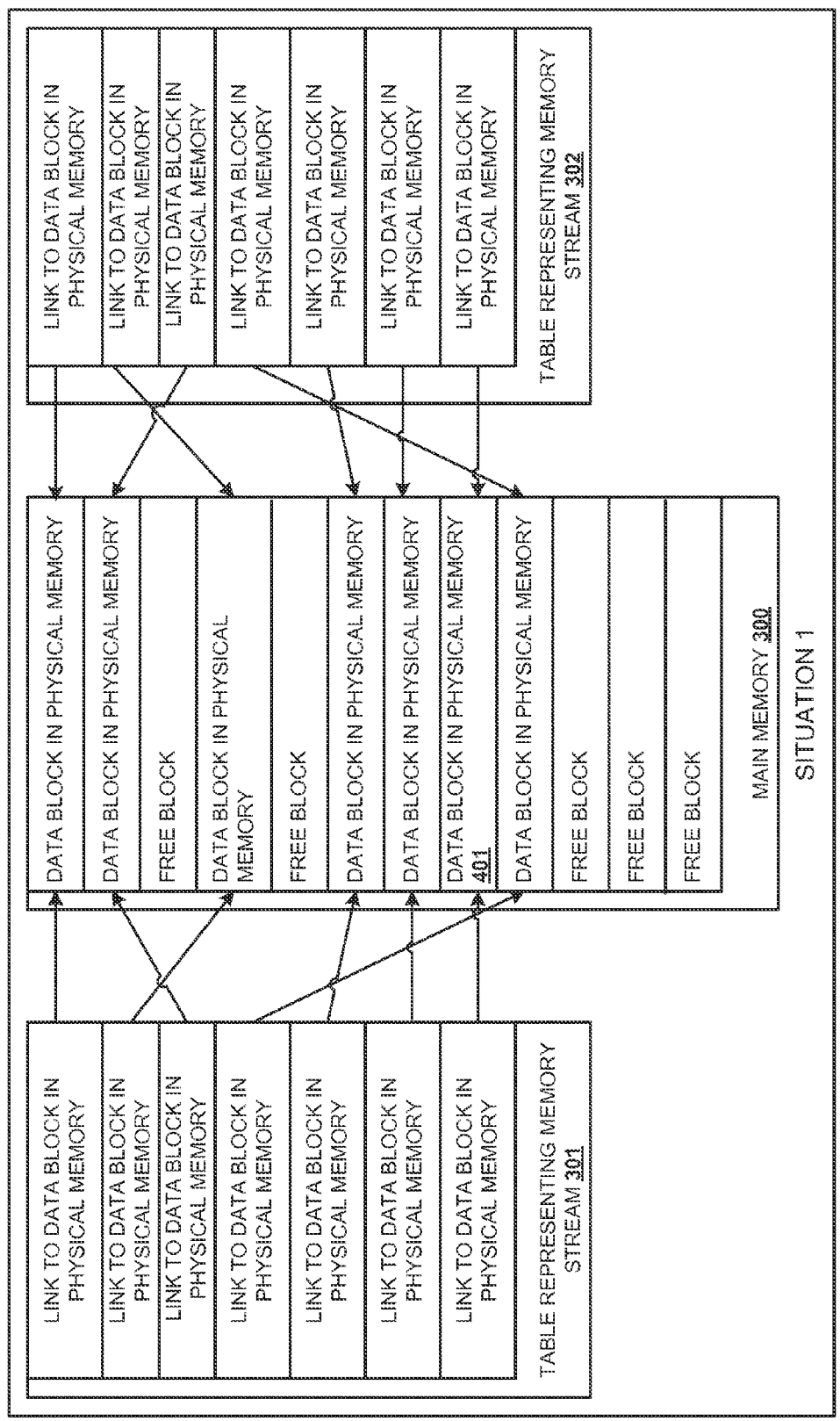
FIG. 3 shows a block diagram representation of the process of implementing snapshot mechanism in an In-memory database system, according to an embodiment.
Figure 4:
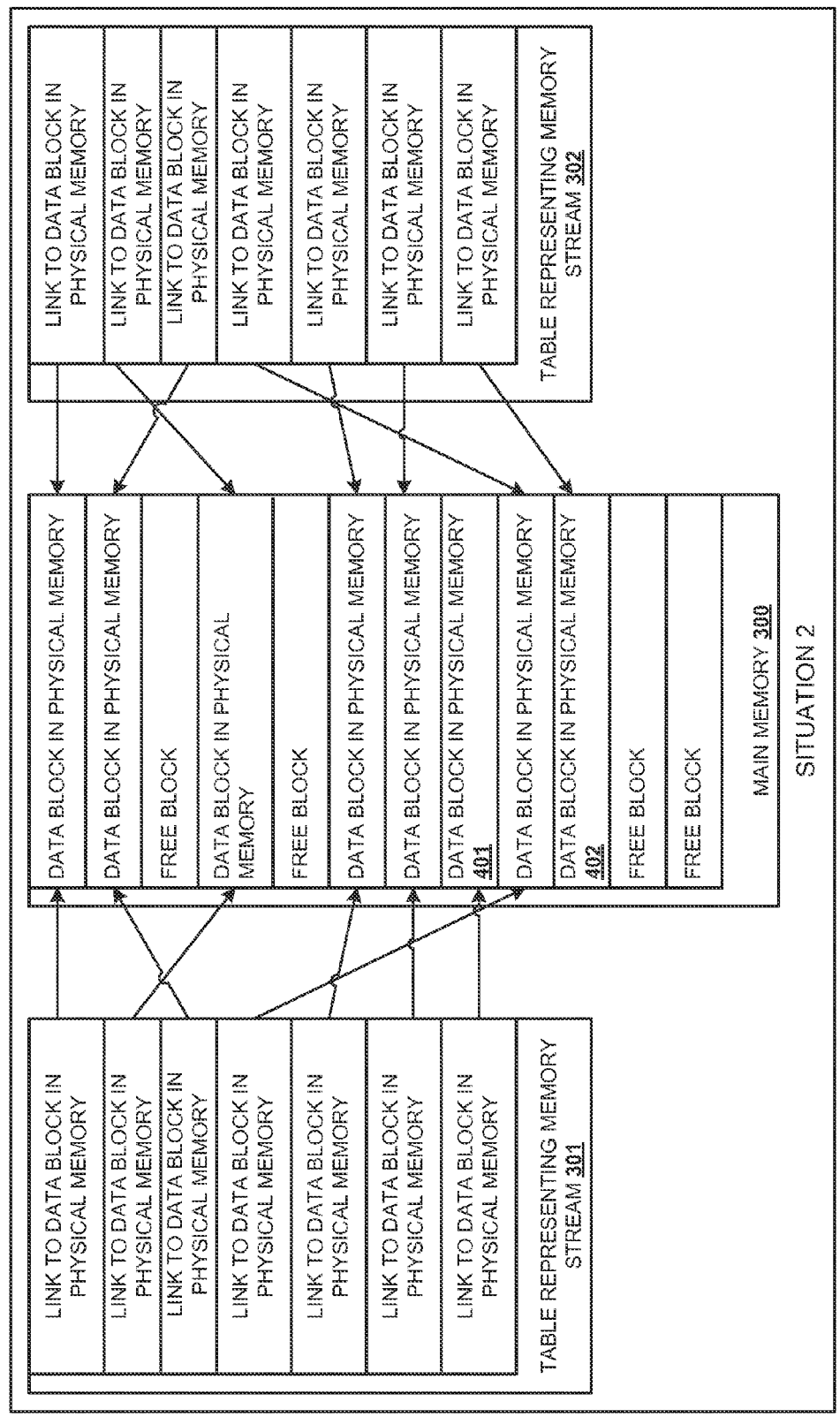
FIG. 4 shows a block diagram representation of the process of implementing snapshot mechanism in an In-memory database system, according to another embodiment.

The process of performing backup operation in In-memory database systems using snapshot technique is illustrated using a block diagram representation shown in FIGS. 3 to 4. FIG. 3 shows block 300 representing the main memory (Primary Storage), block 301 representing a data structure for a memory stream at a particular point in time and block 302 representing a data structure for the memory stream at a later point in time. As shown, the main memory 300 is divided into multiple fixed size blocks of data, which are sequences of bits and bytes. The multiple blocks may be further sorted into multiple block groups (sequence of blocks) each forming a stream of data (data set). A separate data structure is generated for each of the block groups holding the meta-data information identifying the data blocks that form the stream of data. In an aspect, the data structure is a link-table such as a local descriptor table (LDT). In the given example, upon receiving a request to create a backup for a data stream in the main memory, the data set is disabled for manipulation by the system. Further, the data structure for the data stream (represented by the blocks of data in the main memory) is invoked and a snapshot of the data structure 301 is taken. The snapshot is then saved to an available memory space in the main memory. Subsequent to taking the snapshot of the data structure, the data set is released for manipulation by requesting applications. If no modification to the data stream in the main memory occurred since taking the snapshot, then the data structure 301 remains the same.

In the instance that a request for modifying a data block is received since the snapshot, as shown in the example in FIG. 4, the data block 401 that is required for modification is copied to a free memory block 402 in main memory 300. The requesting application may then carry out modification on the copied data block 402. The data structure 301 is then updated to 302 by replacing the original meta-data identifying the data block 401 is replaced with meta-data identifying the data block 402 which represents the copied data block. During the backup process, the data stream is available to the requesting applications/programs for manipulation in parallel. The term "parallel" as used herein refers to simultaneously, as and when, or at the same instance of time. The backup of the data stream may be performed by low priority processes. Those applications that require access to the data stream as it was prior to the modification may access a copy of the original data stream stored in the persistent storage.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
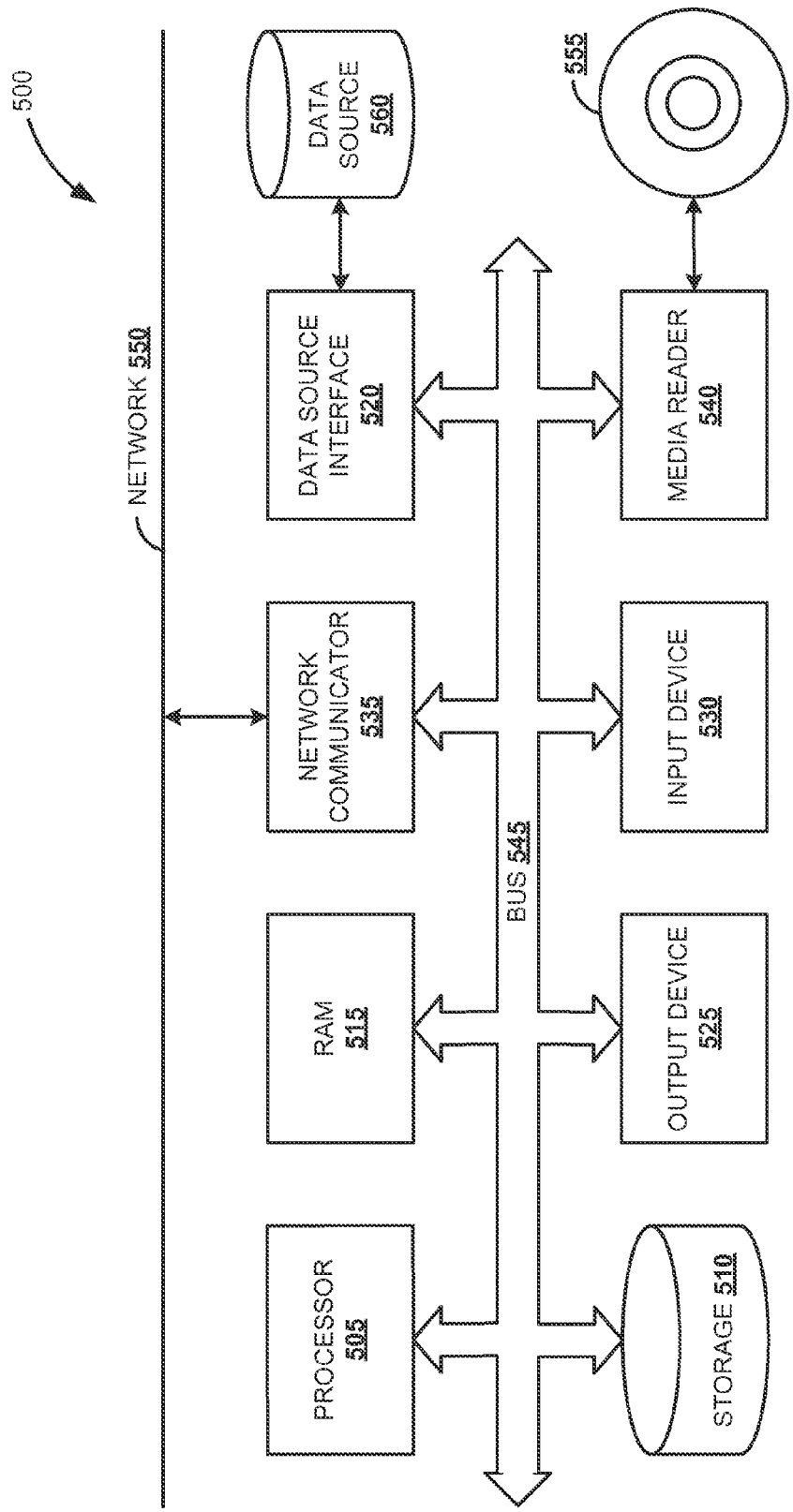
FIG. 5 is a block diagram of an exemplary computer system, according to one embodiment.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g. XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of the embodiments described herein. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments described herein are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments described herein, including what is described in the Abstract, is not intended to be exhaustive or to limit the invention to the precise forms disclosed. While specific embodiments of, and examples are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method of creating a backup of data in an In-memory database system, the method comprising receiving a request to create a backup of a data set from a main memory of the system,
   disabling manipulation of the data set by the system,
   invoking a data structure comprising meta-data information identifying one or more data blocks in the main memory that form the data set,
   creating a snapshot of the data structure,
   storing the snapshot of the data structure in the mam memory,
   enabling manipulation of the data set by the system,
   receiving a request from the system to modify at least one block of the one or more blocks of data,
   copying the at least one data block to a free memory block in the main memory to perform the requested modification on the copied data block, and
   updating the data structure by replacing original meta-data identifying the at least one block of data with new meta-data identifying the free memory block, and
   creating the backup of the data set by duplicating the data set using meta-data information from the snapshot of the data structure and storing the duplicated data set in a target memory.

2. The method of claim 1, wherein the steps of receiving the request to modify the at least one data block, copying the at least one data block, and updating the data structure are performed in parallel to creating the backup of the data set and storing the snapshot of the data structure in the maim memory.

3. The method of claim 1 further comprising upon creating the backup of the data set, deleting the snapshot of the data structure and the copy of the at least one data block in the free memory block from the main memory.

4. The method of claim 1 wherein copying the at least one data block to the free memory block comprises copying the at least one data block to a block that contains no data and has not yet been allocated a memory space for data.

5. The method of claim 1, wherein the snapshot of the data structure represents the data structure for the data set as it was prior to modification.

6. The method of claim 1, wherein the updated data structure comprises links to the one or more blocks of data forming the data set in its modified form.

7. A non-transitory computer readable storage medium storing instructions to control a computer system for generating information models, comprising:
   an In-memory database system component that is configured to control the computer system to
      receive a request to create a backup of a data set from a main memory of the system,
      disable manipulation of the data set by the system,
      invoke a data structure comprising meta-data information identifying one or more data blocks in the main memory that form the data set,
      create a snapshot of the data structure,
      store the snapshot of the data structure in the main memory,
      enable manipulation of the data set by the system,
      receive a request from the system to modify at least one block of the one or more blocks of data,
      copy the at least one data block to a free memory block in the main memory to perform the requested modification on the copied data block, and
      update the data structure by replacing original meta-data identifying the at least one block of data with new meta-data identifying the free memory block, and
      create the backup of the data set by duplicating the data set using meta-data information from the snapshot of the data structure and storing the duplicated data set in a target memory.

8. The storage medium of claim 7, wherein the snapshot of the data structure represents the data structure for the data set as it was prior to modification.

9. The storage medium of claim 7, wherein the updated data structure comprises links to the one or more blocks of data forming the data set in its modified form.

10. An In-memory database system comprising:
    a computer comprising a main memory to store a program code, and a processor to execute the program code to:
    receive a request to create a backup of a data set from the main memory;
    disable manipulation of the data set by the system,
    invoke a data structure comprising meta-data information identifying one or more data blocks in the main memory that form the data set,
    create a snapshot of the data structure,
    store the snapshot of the data structure in the main memory,
    enable manipulation of the data set by the system,
    receive a request from the system to modify at least one block of the one or more blocks of data,
    copy the at least one data block to a free memory block in the main memory to perform the requested modification on the copied data block,
    update the data structure by replacing original meta-data identifying the at least one block of data with new meta-data identifying the free memory block, and
    create the backup of the data set by duplicating the data set using meta-data information from the snapshot of the data structure and storing the duplicated data set in a target memory.

11. The system of claim 10, wherein the main memory is a volatile memory.

12. The system of claim 10, wherein the target memory is a non-volatile memory.

13. The system of claim 10, wherein the data set is an In-memory database.

14. The system of claim 10, wherein the data structure is a Local Descriptor Table.

15. The system of claim 10, wherein the snapshot of the data structure represents the data structure for the data set as it was prior to modification.

16. The system of claim 10, wherein the updated data structure comprises links to the one or more blocks of data forming the data set in its modified form.

17. The system of claim 10, wherein the duplicated data set is stored in the target memory by low priority processes.

* * * * *